US009806586B2

(12) United States Patent
Granat et al.

(10) Patent No.: US 9,806,586 B2
(45) Date of Patent: Oct. 31, 2017

(54) ELECTRIC MACHINE WITH IMPROVED COOLING

(71) Applicant: SIEMENS AKTIENGESELLSCHAFT, München (DE)

(72) Inventors: Gerd Granat, Untergriesbach (DE); Walter Putz, Pocking (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 15/325,353

(22) PCT Filed: Jun. 29, 2015

(86) PCT No.: PCT/EP2015/064720
§ 371 (c)(1),
(2) Date: Jan. 10, 2017

(87) PCT Pub. No.: WO2016/008709
PCT Pub. Date: Jan. 21, 2016

(65) Prior Publication Data
US 2017/0163125 A1 Jun. 8, 2017

(30) Foreign Application Priority Data

Jul. 14, 2014 (EP) .................................. 14176877.0

(51) Int. Cl.
*H02K 9/18* (2006.01)
*H02K 1/20* (2006.01)
(Continued)

(52) U.S. Cl.
CPC ................. *H02K 9/18* (2013.01); *H02K 1/20* (2013.01); *H02K 1/32* (2013.01)

(58) Field of Classification Search
CPC .. H02K 9/18; H02K 9/08; H02K 9/10; H02K 9/14; H02K 9/19; H02K 1/20; H02K 1/32; H02K 5/20
See application file for complete search history.

(56) References Cited

U.S. PATENT DOCUMENTS 3,457,439 A * 7/1969 Gering Tibor ........... H02K 9/18
310/52
2012/0217756 A1* 8/2012 Balzer ...................... H02K 5/20
290/55

(Continued)

FOREIGN PATENT DOCUMENTS

| DE | 102012213070 A1 | 1/2014 |
| GB | 997197 A | 7/1965 |
| SU | 754575 A1 | 8/1980 |

*Primary Examiner* — Michael Andrews
(74) *Attorney, Agent, or Firm* — Henry M. Feiereisen LLC (57) ABSTRACT

An electric machine includes a housing having a first hollow cylinder-shaped housing element for guidance of a first cooling medium in a first axial direction, and a second hollow cylinder-shaped housing element in which the first housing element is arranged. Arranged in the first housing element is a hollow cylinder-shaped stator and a rotor which is mounted in the stator for rotation about a rotational axis. A heat exchanger cover is arranged between the first and second housing elements and includes a guide element running helically about the rotational axis, and pipes extending axially and passing through the guide element. The heat exchanger cover guides the first cooling medium between the pipes in a helical manner along the at least one guide element in a second axial direction which runs opposite to the first axial direction, and guides a second cooling medium through the pipes in an axial direction.

18 Claims, 4 Drawing Sheets

(51) Int. Cl.
*H02K 5/20* (2006.01)
*H02K 1/32* (2006.01)

(56) References Cited

U.S. PATENT DOCUMENTS

2014/0117796 A1* 5/2014 Kassler .................. H02K 9/19
310/54
2015/0207378 A1 7/2015 Buttner et al.

* cited by examiner

ELECTRIC MACHINE WITH IMPROVED COOLING

CROSS-REFERENCES TO RELATED APPLICATIONS

This application is the U.S. National Stage of International Application No. PCT/EP2015/064720, filed Jun. 29, 2015, which designated the United States and has been published as International Publication No. WO 2016/008709 A1 which claims the priority of European Patent Application, Serial No. 14176877.0, filed Jul. 14, 2014, pursuant to 35 U.S.C. 119(a)-(d).

BACKGROUND OF THE INVENTION

The invention relates to an electric machine comprising a hollow cylinder-shaped stator, a rotor which is rotatably mounted about a rotational axis in the stator, a housing having a first, hollow cylinder-shaped housing element in which the stator and the rotor are arranged, and a second hollow cylinder-shaped housing element in which the first hollow cylinder shaped-housing element is arranged, in addition to a heat exchanger cover which is arranged between the first housing element and the second housing element.

An electric machine of this type is used as an air-cooled electric machine for instance. Such machines are often operated either with the aid of a forced-air ventilated or self-ventilated cooling circuit.

Such machines are often embodied to be single-flow and pipe-cooled, wherein for example previously cooling air flowed along the machine axis in parallel to closely arranged cooling pipes.

DE 10 2012 213 070 A1 discloses an electric machine with a cooling jacket for cooling using a fluid flowing in the cooling jacket, wherein the cooling jacket comprises a jacket having an inner jacket and an outer jacket, wherein the jacket has an opening at an axial end. Furthermore, the cooling jacket comprises a sealing means, which is arranged in the opening, and a radial deformation, which connects the jacket to the sealing means, wherein the radial deformation extends into the opening.

SUMMARY OF THE INVENTION

The object underlying the invention is to provide an electric machine with an improved cooling.

This object is achieved by an electric machine of the type cited in the introduction, in that the heat exchanger cover has at least one guide element which runs essentially helically about the rotational axis in addition to pipes which run essentially axially and pass through the respective guide element, wherein the electric machine is designed, at least in sections, such that a first cooling medium can be guided through the first housing element in a first axial preferred direction, wherein the heat exchanger cover is designed, at least in sections, such that the first cooling medium can be guided between the pipes in a helical manner along each guide element in a second axial preferred direction which runs counter to the first direction, wherein the heat exchanger cover is designed, at least in sections, such that a second cooling medium can be guided through the pipes in an axial direction.

A particularly effective cooling of the electric machine is enabled in particular by the heat exchanger cover. During operation the first cooling medium can absorb waste heat from the electric machine, in particular the stator and rotor arranged in the first housing element, and with the aid of the heat exchanger cover the second cooling medium can release it. For an improved heat transfer, provision is made here for at least one guide element, which extends essentially helically about the rotational axis. Helically is understood here to mean following a curve which winds with an essentially constant gradient about the jacket of a cylinder, and is also referred to as a helix, helical line or spiral coil. The first cooling medium is guided along the respective guide element so that it can flow helically along the respective element at least in sections. The resulting flow of coolant of the first cooling medium thus comprises an overlay of an axial flow component with a flow component in the peripheral direction. The heat exchanger cover has corresponding recesses for the entry and exit of the first cooling medium. Provision is made here that the first cooling medium within the first housing element can be guided, at least in sections, in the first axial preferred direction and in the cooling jacket along the second axial preferred direction. In particular, a first cooling circuit, in which the first cooling medium is guided, can be embodied to be closed, which also introduces the advantage of an increased explosion protection.

The second cooling medium is guided through the pipes which run essentially axially through the heat exchanger cover, wherein the pipes in effect penetrate the respective guide element. For instance, a second cooling circuit, in which the second cooling medium is guided, can be embodied to be closed or open, wherein the second cooling circuit guides the second cooling medium preferably past a heat sink so that the second cooling medium can release the waste heat in the electric machine. The second cooling circuit is preferably designed here to be open, so that the second cooling medium is guided from outside of the electric machine or housing into the housing and is finally released again outside of the electric machine or housing.

The waste heat of the electric machine absorbed by the first cooling medium can thus be released to the second cooling medium by way of the pipes. On account of the helical guidance by means of the respective guide element, it is particularly advantageous here for the first cooling medium not to be guided in parallel to the pipes in which the second cooling medium can flow. Instead, there is provision for the first cooling medium to be guided obliquely to almost at right angles to the pipes, as a result of which a particularly good heat transfer can be achieved. The proposed electric machine thus achieves the improved cooling in particular by an improved and optimized guidance of the first cooling medium. Here the heat transfer from the first cooling medium via the pipes to the second cooling medium is designed particularly advantageously, particularly in comparison with the pipes around which cooling medium flows in parallel.

Air, cooling water or oil can be selected for instance for the first cooling medium and/or the second cooling medium. This is particularly dependent on the heat to be discharged from the electric machine, the installation space available and any existing supply connections. Air, in particular in a closed first cooling circuit, is preferably used here as a first cooling medium. Air, advantageously in an open second cooling circuit, or for instance cooling water, which is supplied and discharged by way of a corresponding supply lines, can likewise be used as a second cooling medium.

The guide element or guide elements together preferably extend/s at least along three quarters of the axial extent of the stator, in particular at least along the complete axial extent of the stator. The pipes are preferably longer in the axial direction than the axial extent of the guide element or guide elements, wherein the pipes preferably extend at least along the complete axial extent of the stator, in particular at least along the complete axial extent of the stator including the winding heads. The pipes can, in principle, have an annular cross-section or, in particular for surface enlargement, another type of cross-section.

In an advantageous embodiment of the invention, the respective guide element is designed such that a pitch angle of the respective helical path amounts at most to 60°, preferably 10° to 30°.

The pitch angle which is also referred to as escaping arc depends on the pitch and the radius of the helical path, wherein the pitch is the segment in the axial direction around which the respective guide element winds with a full revolution in the axial direction. The pitch angle can be computed as an arc tangent from the quotient made up of the pitch and the circumference, wherein the circumference is 2 times the circle constant Π times the radius.

By means of the pitch angle the angle of incidence is defined at the same time, in which the first cooling medium can flow against the pipes. With a small or large pitch angle, the flow of the first cooling medium strikes the pipes almost at right angles or almost in parallel. The pitch is advantageously selected such that the pitch angle amounts at most to 60°, the pitch angle preferably lies in a range of 50° to above 0°, wherein particularly good results can be achieved with a pitch angle of 10° to 30°. Accordingly the angle of incidence amounts at least to 30°, preferably the angle of incidence lies in a range of 40° to below 90°, wherein particularly good results can be achieved with an angle of incidence of 60° to 80°.

In an advantageous embodiment of the invention, the electric machine is designed such that the first cooling medium is separated from the second cooling medium in a fluid-tight manner.

The fluid-tight separation of the two cooling media permits a particularly good explosion protection. As a result, explosive dust can be particularly reliably prevented from entering regions of the electric machine with high voltage, in particular close to the stator and, where applicable, the rotor. The fluid-tight separation can be achieved for instance in that the first cooling circuit, in which the first cooling medium is guided, is embodied to be closed.

In a further advantageous embodiment of the invention, the stator has a stator active part and a winding head projecting from the stator active part at its respective axial front end, wherein the rotor has a rotor active part, wherein the rotor has at least one rotor opening at least at a first axial front end, wherein the rotor and the stator have rotor cooling ducts or stator cooling ducts which are open radially outwards at a plurality of axial positions, wherein the rotor cooling ducts are connected to the respective rotor opening, wherein at least one recess is arranged between the stator and the first housing element, through which recess the first cooling medium can be guided in the axial direction.

Within the first housing element the first cooling medium is guided, at least in sections, along the first axial preferred direction, wherein the rotor here has at least one rotor opening at least at its first axial front end. The respective rotor opening is connected to the rotor cooling ducts arranged along the axial extent of the rotor so that the first cooling medium can flow via the respective rotor opening and the cooling ducts through the rotor. Here the flow of the first cooling medium extends through the respective rotor opening essentially in the axial direction and through the rotor cooling ducts which open radially outwards essentially in the radial direction.

For low-loss guidance of the flow of the first cooling medium, the stator cooling ducts are arranged at approximately the same axial positions as the rotor cooling ducts, wherein the flow of the first cooling medium through the stator thus also runs essentially in the radial direction. The respective recess arranged between the stator and the first housing element connects to the stator cooling ducts which are open radially outwards, so that the first cooling medium can finally flow essentially in the axial direction through the respective recess.

An embodiment of this type permits a reliable cooling of the active parts of the electric machine. Here the rotor preferably has a spider shaft, on which the rotor active part, for instance the rotor laminated core or a permanent magnet arrangement, is arranged. The respective rotor openings and the supply line to the outwardly open rotor cooling ducts are thus realized by way of the respective groove between two adjacent webs of the spider shaft. With a rotating rotor, the webs of the spider shaft here bring about a recirculation of the first cooling medium. This can be further assisted by what are known as pressure fingers, which are arranged between two rotor cooling ducts, which in the axial direction are arranged at approximately the same position and then adjacent to one another in the circumferential direction.

In a further advantageous embodiment of the invention, the electric machine here has at least one first guide apparatus at least at its first axial front end, by means of which the first cooling medium can, in each case, be routed from the heat exchanger cover to the respective rotor opening and to the respective winding head.

The respective first guide apparatus ensures that the first cooling medium is reliably guided through the rotor and the stator and is in addition guided to the respective winding head. In particular a bypass, in terms of flow, can be prevented by the respective first guide apparatus. The respective first guide apparatus is preferably arranged in the region of the axial front end of the rotor, at which respective rotor openings are also provided.

In a further advantageous embodiment of the invention, the electric machine here has a first turbo-machine for recirculating the first cooling medium, wherein the electric machine has at least one second guide apparatus at least at a second axial front end, wherein by means of the respective second guide apparatus the first cooling medium can be routed from the respective winding head to the first turbo-machine and from the first turbo-machine to the heat exchanger cover.

To recirculate the first cooling medium, the electric machine has a first turbo-machine, which is arranged in the axial region in which the respective second guide apparatus is also disposed. The respective second guide apparatus is usually arranged here in the axial extension of the stator or the rotor within the housing, in particular within the first housing element.

The respective second guide apparatus permits a low-loss flow of coolant of the first cooling medium from the respective winding head to the first turbo-machine and then from the first turbo-machine to the heat exchanger cover. In principle, a reverse direction of flow of the first cooling medium is however also conceivable.

In particular, there is only provision for a first turbo-machine for recirculating the first cooling medium, wherein the first cooling medium is fed to the stator and the rotor at the first axial front end for instance and flows away at the second axial front end. In this case the first cooling medium passes through the stator and the rotor via its respective overall axial extent in an axial preferred direction from the first to the second axial front end, wherein the first turbo-machine is preferably embodied as a radial turbo-machine. Advantageously the rotor openings are arranged on the front end of the rotor which faces the radial turbo-machine, wherein on the front end of the radial turbo-machine the rotor has no such rotor openings at its front end.

In the case of a reverse direction of flow, the first cooling medium is routed by the respective second guide apparatus in particular from the heat exchanger cover to the first turbo-machine and then from the first turbo-machine to the respective winding head. To this end the first turbo-machine is advantageously designed as an axial turbo-machine. The respective second guide apparatus preferably also permits the first cooling medium to be fed, alongside the respective winding head, to any existing rotor openings. If the first cooling medium is passed through the rotor and the stator along their entire axial extent along a second axial preferred direction from the second axial front end to the first axial front end, rotor openings are preferably only arranged on the second axial front end of the rotor. In addition, at least one further guide apparatus can be provided at the first axial front end, by means of which the first cooling medium can be guided in each case from the respective winding head into the heat exchanger cover.

In an alternative advantageous embodiment of the invention, the electric machine here has two first turbo-machines for recirculating the first cooling medium, wherein the electric machine has a third guide apparatus at its two axial front ends in each case, wherein by means of the respective third guide apparatus the first cooling medium can be routed from the heat exchanger cover to the respective first turbo-machine and from the respective first turbo-machine to the respective rotor opening and to the respective winding head.

One of the two first turbo-machines for recirculating the first coolant is arranged at each of the two axial front ends, wherein the respective third guide apparatus ensures that the first cooling medium can be efficiently routed from the heat exchanger cover to the respective first flow machine and then from the respective first turbo-machine to the respective rotor opening and to the respective winding head. To this end the rotor has rotor openings at each of its two axial front ends, wherein an axial turbo-machine is preferably used in each case. During operation, in the interior of the first housing element the electric machine thus has a respective axial preferred direction in respect of the flow of the first cooling medium, which is directed from the respective front end to the axial center. As a result, a flow of coolant of the first cooling medium which is in particular symmetrical to the axial center is permitted so that an overheating of the electric machine in the region of its axial center and in particular of the two winding heads is reliably prevented for instance.

In principle, a reverse direction of flow of the first cooling medium is also conceivable here, wherein to this end a radial turbo-machine is advantageously used in each case. In particular, the afore-cited at least one first guide apparatus can be embodied as one of the third guide apparatuses.

In a further advantageous embodiment of the invention, the first housing element here has at least one passage in the region of its axial center, through which the first cooling medium can be guided from within the first housing element into the heat exchanger cover in each case.

The arrangement of the respective passage in the region of the axial center of the first housing element permits a flow of coolant of the first cooling medium which is in particular symmetrical to the axial center, as a result of which an overheating of the electric machine in the region of its axial center and in particular of the two winding heads is reliably prevented for instance.

Here the heat exchanger cover preferably has two helical guide elements, which extend from the region of the axial center to the respective front end. The two heat-conducting elements can be designed here such that their helical paths have the same direction of rotation or preferably opposing directions.

In a further advantageous embodiment of the invention, the housing has at least one first housing opening and at least one second housing opening for the inflow and outflow of the second cooling medium, wherein the electric machine has a second turbo-machine for recirculating the second cooling medium, wherein the second turbo-machine and the pipes of the heat exchanger cover are arranged, in terms of flow, between the respective first housing opening and the respective second housing opening.

The second cooling circuit, in which the second cooling medium is guided, is thus embodied to be open, wherein the second cooling medium can flow inwards or outwards via the respective first housing opening and the respective second housing opening through the housing. The second cooling medium is recirculated here by the second turbo-machine, as a result of which a reliable removal of the waste heat in the electric machine is ensured.

In a further advantageous embodiment of the invention the at least one first housing opening is arranged here in the region of a first axial front end and the at least one second housing opening is arranged in the region of a second axial front end.

The pipes advantageously extend at least along the complete axial extent of the rotor or the stator, wherein the second cooling medium always flows in the same axial direction. The remaining electric machine is preferably also designed such that the first cooling medium in the heat exchanger cover always flows in the same axial direction along the complete axial extent of the rotor or of the stator. A particularly good heat transfer is achieved here in that a counterflow cooling is realized, so that the direction of flow of the second cooling medium runs counter to that of the first cooling medium.

For instance, the respective housing opening can be arranged on a radial or an axial outer surface of the housing, so that the second cooling medium can flow into the housing or out of the housing in the radial or axial direction.

Provision is preferably made for the second cooling medium, after entering the housing, to be routed radially inwards by means of an appropriately designed guide unit, fed to a radial-flow fan and guided by means of the guide unit into the pipes.

In an alternative advantageous embodiment of invention, a first housing opening is arranged here in each case in the region of the respective axial front end and the at least one second housing opening is arranged in the region of the axial center.

The pipes advantageously extend at least from the respective front end of the stator or the rotor and in as far as the region of the axial center, wherein the pipes are connected at the respective front end to the respective first housing opening and in the region of the axial center to the respective second housing opening. Two second turbo-machines can be provided here, wherein the one second turbo-machine is arranged at the one axial front end and the other second turbo-machine is arranged at the other axial front end in each case between the pipes and the respective second housing opening.

In a respective axial section, a flow of coolant of the second cooling medium is produced in particular from the respective axial front end to the axial center, wherein the respective second turbo-machine is preferably designed as a radial turbo-machine. The remaining electric machine is preferably designed such that the first cooling medium in the heat exchanger cover flows through the respective aforementioned passage from the axial center to the respective axial front end so that a counterflow cooling is realized, in which the direction of flow of the second cooling medium runs counter to that of the first cooling medium in the two axial regions in each case.

In principle, a reverse direction of flow of the second cooling medium is also conceivable.

For instance, the respective first housing opening can be arranged on a radial or an axial outer surface of the housing, so that the second cooling medium can flow into or out of the housing in the radial or axial direction.

In a further advantageous embodiment of the invention, the electric machine can be operated with an electrical power of at least 1 MW, in particular more than 3 MW, the electric machine has an axial height of at least 500 mm, in particular more than 630 mm, and/or the electric machine is designed as a generator, in particular a wind power generator, or as a drive motor for a pump drive, a compressor drive or a steelwork drive.

The turbo-machines described can have propeller blades connected in particular in a torque-proof manner to the rotor or a shaft of the electric machine, wherein turbo-machines which can be operated independently of the rotational speed of the rotor or the shaft can also be used.

BRIEF DESCRIPTION OF THE DRAWINGS

Figure 1:
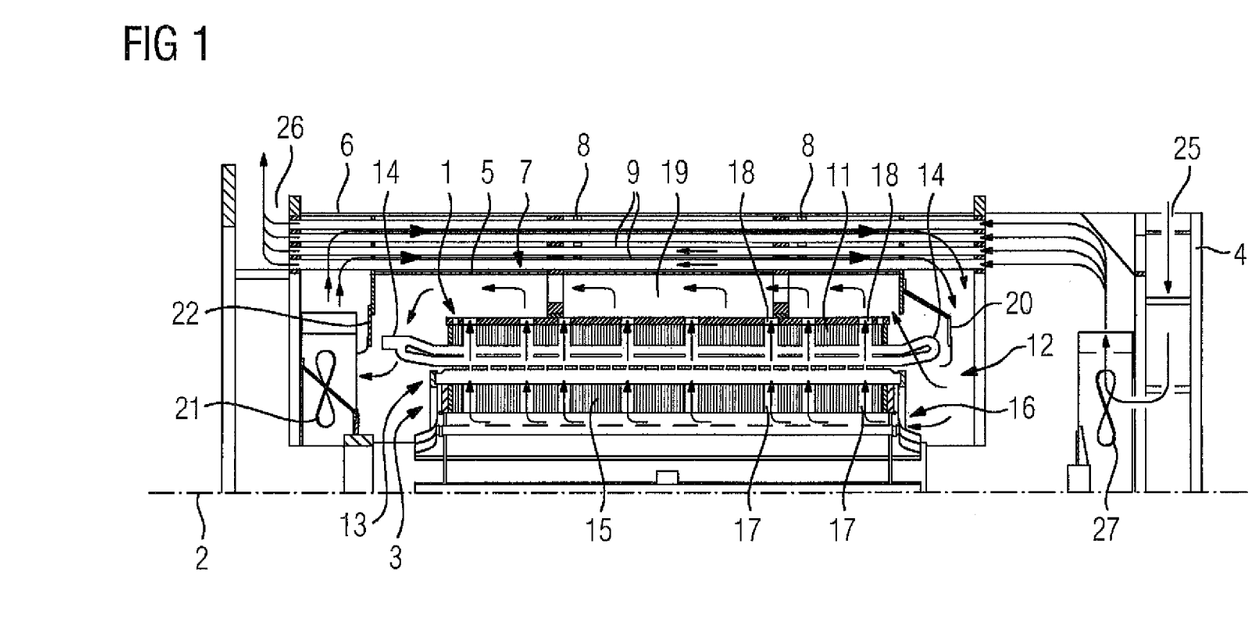
FIG. 1 shows a first exemplary embodiment of the inventive electric machine.

The invention is described and explained in more detail below on the basis of the exemplary embodiments shown in the figures, in which:

FIG. 1 shows a first exemplary embodiment of the inventive electric machine. Here a longitudinal section is shown along a rotational axis 2 of the electric machine.

DETAILED DESCRIPTION OF THE EMBODIMENTS

The electric machine has a housing 4 with a first hollow cylinder-shaped housing element 5 and a second, hollow cylinder-shaped housing element 6. A hollow cylinder-shaped stator 1 and a rotor 3 rotatably mounted about the rotational axis 2 in the stator 1 are arranged in the first housing element 5. The first housing element 5 is in turn arranged within the second housing element 6. A heat exchanger cover 7 is arranged between the first housing element 5 and the second housing element 6. The heat exchanger cover 7 has a guide element 8 which runs essentially helically about the rotational axis 2 in addition to pipes 9 which run essentially axially and pass through the guide element 8, as shown in more detail in FIG. 2.

The electric machine is designed such that a first cooling medium can be guided through the first housing element 5 in a first axial preferred direction. Within the scope of the exemplary embodiment, the first cooling medium is guided within the first housing element 5 from a first axial front end 12, to the right in FIG. 1, to a second axial front end 13, to the left in FIG. 1. To this end part of the first cooling medium can enter the rotor 3 at the first axial front end 12 via at least one rotor opening 16 in the axial direction and can leave the rotor 3 again via rotor cooling ducts 17 which are arranged in the rotor active part 15 and are open radially outwards. To this end the rotor 3 has no rotor openings 16 of this type at the second axial front end 13. Stator cooling ducts 18 connect to the rotor cooling ducts 17 in the stator active part 11, through which stator cooling ducts the first cooling medium can flow radially outwards. Another part of the first cooling medium can flow around a winding head 14, which projects axially out of the stator active part 11 at the first axial front end 12. The first cooling medium is then guided in full in a recess 19 arranged between the stator 1 and the first housing part 5 in an axial direction to the second axial front end 13, in order to be guided past the winding head 14 there out of the first housing element 5 to a first turbo-machine 21, by means of which the first cooling medium can be recirculated. The first turbo-machine 21 is preferably embodied here as a radial turbo-machine.

The heat exchanger cover 7 is designed such that the first cooling medium can be guided through the pipes 9 in a helical manner along the guide element 8 in a second axial preferred direction which runs counter to the first. Within the scope of the exemplary embodiment, the first cooling medium is guided within the heat exchanger 7 from the second axial front end 13 to the first axial front end 12.

To guide the first cooling medium, a first guide apparatus 20 is provided here at the first axial front end 12, by means of which guide apparatus the first cooling medium can be routed from the heat exchanger cover 7 to the respective rotor opening 16 and to the respective winding head 14. Furthermore, a second guide apparatus 22 is provided on the second axial front end 13, by means of which the first cooling medium can be routed from the respective winding head 14 to the first turbo-machine 21 and from the first turbo-machine 21 to the heat exchanger cover 7.

Furthermore, the heat exchanger cover 7 is designed such that a second cooling medium can be guided through the pipes 9 in an axial direction. Within the scope of the exemplary embodiment, to this end the housing 4 has a first housing opening 25 at the first axial front end 12 and a second housing opening 26 at the second axial front end 13, through which the second cooling medium can enter or leave the housing 4. A second turbo-machine 27 is provided to recirculate the second cooling medium. Here the pipes 9 and the second turbo-machine 27 are arranged, in terms of flow, between the first housing opening 25 and the second housing opening 26.

Figure 2:
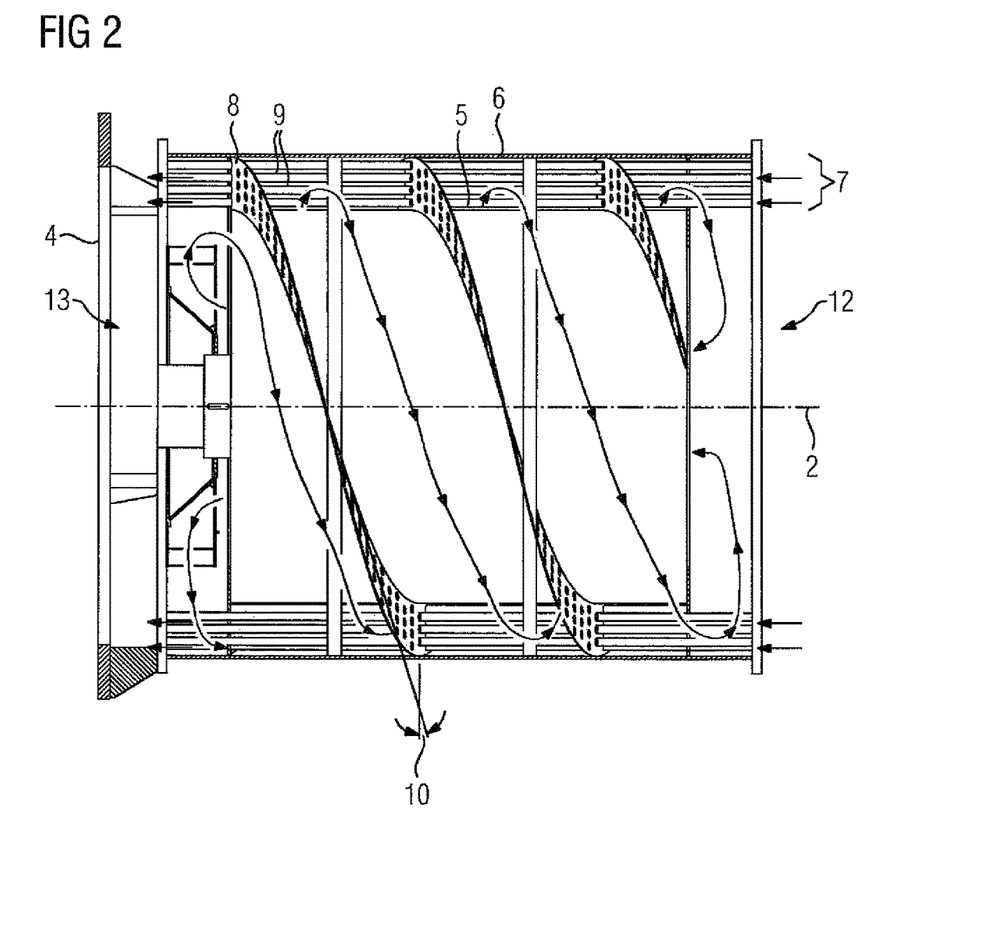
FIG. 2 shows an alternative view of the first exemplary embodiment.

FIG. 2 shows an alternative view of the first exemplary embodiment. Here the same reference characters as in FIG. 1 refer to the same objects. FIG. 2 shows details principally of the heat exchanger cover 7, which is arranged between the first housing element 5 and the second housing element 6. The heat exchanger cover 7 has pipes 9 which run essentially axially, through which the second cooling medium can flow. Within the scope of the exemplary embodiment, the second cooling medium passes through the pipes 9 in the axial direction from the first axial front end 12 to the second axial front end 13. The pipes 9 penetrate the guide element 8 which runs essentially helically about the rotational axis 2. The first cooling medium can flow through the pipes 9 in a helical manner along the guide element 8 from the second axial front end 13 to the first axial front end 12. The guide element 8 here has a pitch angle 10 in respect of its helical path, which preferably amounts at most to 60°, in particular 10° to 30°.

Figure 3:
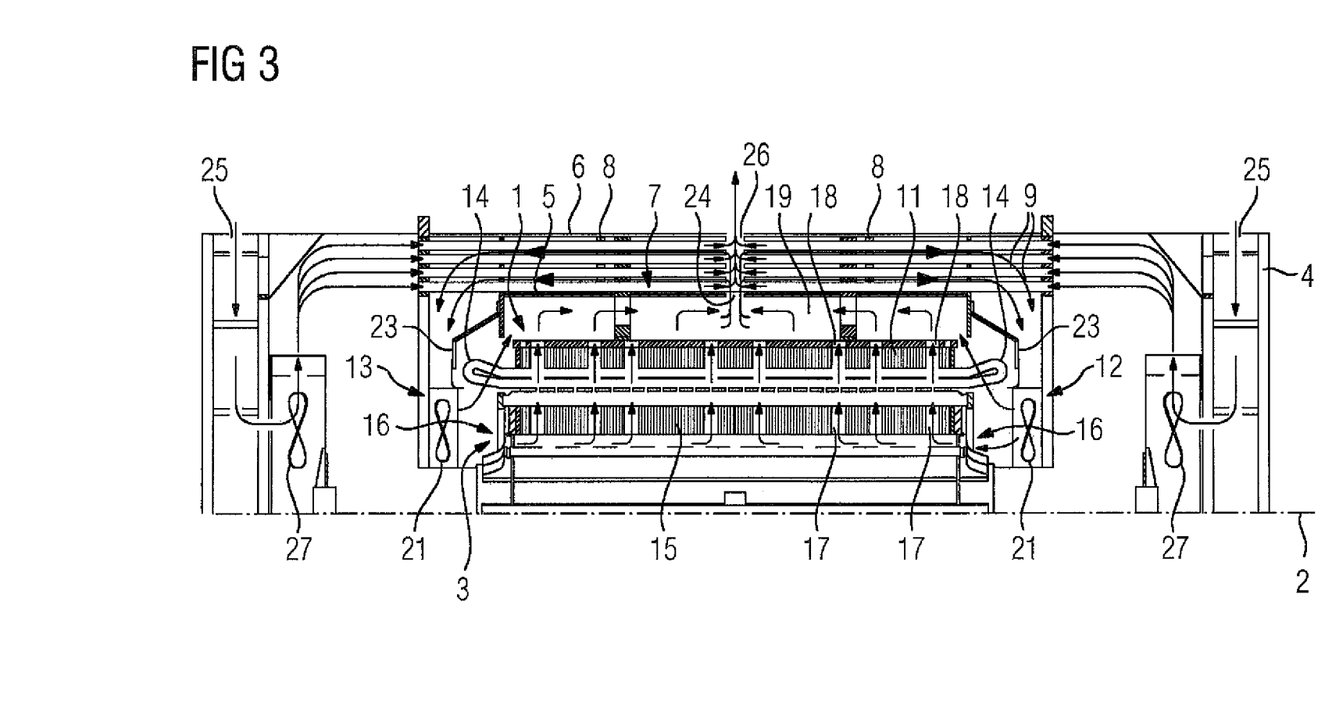
FIG. 3 shows a second exemplary embodiment of the inventive electric machine and FIG. 4 shows an alternative view of the second exemplary embodiment.

FIG. 3 shows a second exemplary embodiment of the inventive electric machine. Contrary to the first exemplary embodiment, the electric machine of the second exemplary embodiment is essentially symmetrical with respect to a cross-section through the axial center of the electric machine.

The guidance of the first cooling medium is configured as follows. In respect of the flow of the first cooling medium, the electric machine has two sections, namely from the respective axial front end 12 or 13 to the axial center. In each of the two sections, the first cooling medium is guided through the first housing element 5 in a first axial preferred direction, which, within the scope of the exemplary embodiment, leads from the respective axial front end 12 or 13 to the axial center. In the heat exchanger cover 7, the first cooling medium is guided in a second axial preferred direction which runs counter to the first, which leads from the axial center to the respective axial front end 12 or 13.

In the region of the respective axial front end 12 or 13 the first cooling medium can leave the heat exchanger cover 7, and guided by a respective third guide apparatus 23, can flow radially inwards to a respective first turbo-machine 21, by means of which the first cooling medium can be recirculated. The respective first turbo-machine 21 is preferably embodied as an axial turbo-machine. The first cooling medium is then guided by means of the respective third guide apparatus 23 to the respective rotor openings 16 and to the respective winding head 14. A respective first part of the first cooling medium can flow here through the rotor 3 via the respective rotor openings 16 and the respective rotor cooling ducts 17 and through the stator 1 via adjoining stator cooling ducts 18. A second part of the first cooling medium can flow around the respective winding head 14, in order to join the respective first part of the first cooling medium in the recess 19 and to flow to the axial center. In the region of the axial center, the first housing element 5 has a passage 24, through which the first cooling medium can be guided from within the first housing element 5 into the heat exchanger cover 7. In the heat exchanger cover 7, a part of the first cooling medium is guided to the first axial front end 12 and the remaining part of the first cooling medium is guided to the second axial front end 13. Here the first cooling medium in the heat exchanger cover 7 is guided in each case between the pipes 9 along the helical guide element 8.

The second cooling medium can enter the housing 4 via the first housing opening 25 arranged at the respective axial front end 12 or 13 and is fed to the pipes 9 of the heat exchanger cover 7. The heat exchanger cover 7 is designed here such that the second cooling medium can be guided through the pipes 9 from the respective axial front end 12 or 13 to the axial center, wherein the second cooling medium can leave the heat exchanger cover 7 via the second housing opening 26 arranged in the region of the axial center. To recirculate the second cooling medium, a second turbo-machine 27 is arranged at the respective axial front end 12 or 13. The respective second turbo-machine 27 is preferably embodied as a radial turbo-machine. The pipes 9 and the respective second turbo-machine 27 are arranged, in terms of flow, between the respective first housing opening 25 and the second housing opening 26.

Figure 4:
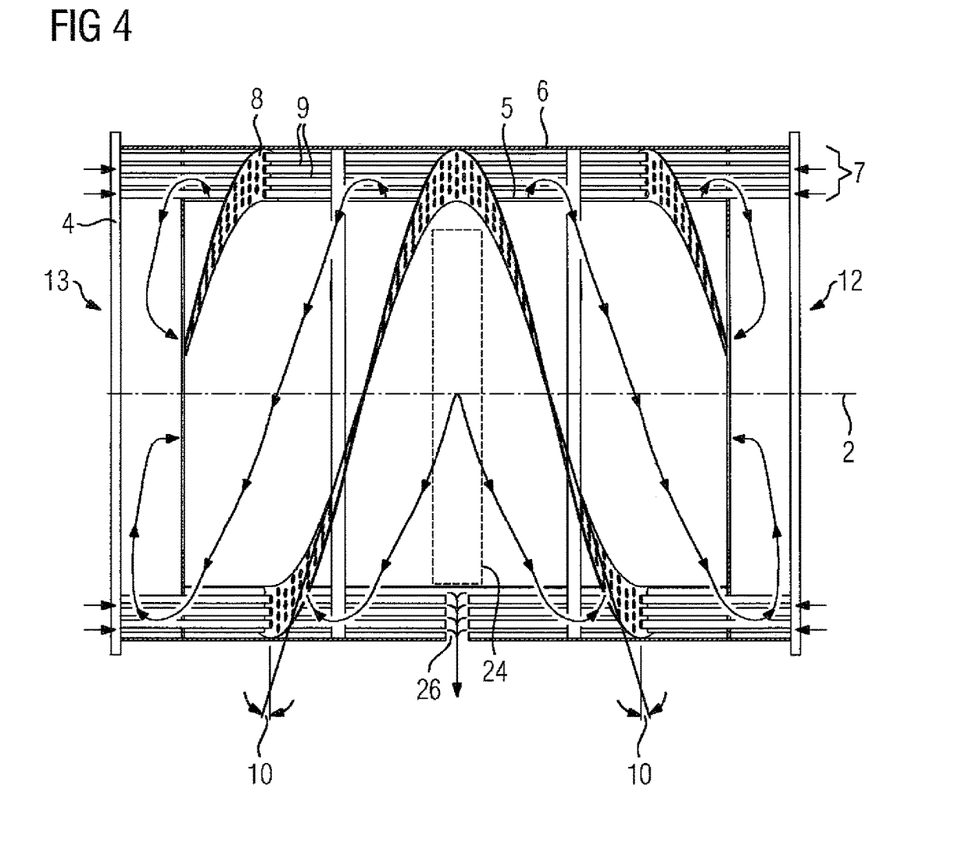

FIG. 4 shows an alternative view of the second exemplary embodiment. Similarly to FIG. 2 for the first exemplary embodiment, details principally of the heat exchanger cover 7 of the second exemplary embodiment are shown in FIG. 4. The heat exchanger cover 7 has pipes 9 which run essentially axially and which extend from the respective axial front end 12 or 13 into the region of the axial center and lead into the second housing opening 26. Within the scope of the exemplary embodiment, the second cooling medium passes through the pipes 9 in the axial direction from the respective axial front end 12 or 13 to the axial center. The pipes 9 penetrate the guide element 8 which runs essentially helically about the rotational axis 2. Within the scope of the exemplary embodiment, the guide element 8 has two helical paths, which are symmetrical to one another with respect to the axial center. The first cooling medium can enter the heat exchanger cover 7 via the passage 24 from the inside of the first housing element 5 and can flow past the pipes 9 in a helical manner along the guide element 8 from the axial center to the respective axial front end 12 or 13. The guide element 8 here has a pitch angle 10 in respect of its respective helical path, which preferably amounts at most to 60°, in particular 10° to 30°.

In principle, with the both exemplary embodiments described, radial turbo-machines can also be used instead of axial turbo-machines and vice versa, particularly using appropriately molded guide elements to efficiently guide the respective flow. It is also conceivable to reverse the direction of flow of the first cooling medium and/or the second cooling medium, wherein radial turbo-machines are preferably used instead of axial turbo-machines and vice versa.

In summary the invention relates to an electric machine comprising a hollow cylinder-shaped stator, a rotor which is rotatably mounted about a rotational axis in the stator, a housing having a first, hollow cylinder-shaped housing element in which the stator and the rotor are arranged, and a second hollow cylinder-shaped housing element in which the first hollow cylinder-shaped housing element is arranged, in addition to a heat exchanger cover which is arranged between the first housing element and the second housing element. In order to provide an electric machine with an improved cooling, it is proposed that the heat exchanger cover has at least one guide element which runs essentially helically about the rotational axis in addition to pipes which run essentially axially and pass through the respective guide element, wherein the electric machine is designed, at least in sections, such that a first cooling medium can be guided through the first housing element in a first axial preferred direction, wherein the heat exchanger cover is designed, at least in sections, such that the first cooling medium can be guided between the pipes in a helical manner along each guide element in a second axial preferred direction which runs counter to the first direction, wherein the heat exchanger cover is designed, at least in sections, such that a second cooling medium can be guided through the pipes in an axial direction.

What is claimed is:
1. An electric machine, comprising:
   a housing including a first hollow cylinder-shaped housing element having at least one section for guidance of a first cooling medium in a first axial direction, and a second hollow cylinder-shaped housing element in which the first hollow cylinder-shaped housing element is arranged;

a hollow cylinder-shaped stator arranged in the first hollow cylinder-shaped housing element;

a rotor arranged in the first hollow cylinder-shaped housing element and mounted in the stator for rotation about a rotational axis; and a heat exchanger cover arranged between the first housing element and the second housing element, said heat exchanger cover including at least one guide element which runs helically about the rotational axis, and pipes which extend axially and pass through the at least one guide element, said heat exchanger cover having at least one section for guidance of the first cooling medium between the pipes in a helical manner along the at least one guide element in a second axial direction which runs opposite to the first axial direction, said heat exchanger cover having at least one section for guidance of a second cooling medium through the pipes in an axial direction.

2. The electric machine of claim 1, wherein the at least one guide element is configured to define a helical path having a pitch angle of at most 60°.

3. The electric machine of claim 1, wherein the at least one guide element is configured to define a helical path having a pitch angle between 10° to 30°.

4. The electric machine of claim 1, wherein the first cooling medium is separated from the second cooling medium in a fluid-tight manner.

5. The electric machine of claim 1, wherein the stator includes a stator active part, winding heads respectively projecting from the stator active part at first and second axial front ends, and stator cooling ducts which open radially outwards at a plurality of axial positions, said rotor including a rotor active part, at least one rotor opening at a first axial front end, and rotor cooling ducts which are connected to the rotor opening and open radially outwards at a plurality of axial positions, said stator and said first, housing element define there between at least one recess for guidance of the first cooling medium in the axial direction.

6. The electric machine of claim 5, further comprising at least one first guide apparatus at one of the first and second axial front ends for routing the first cooling medium from the heat exchanger cover to the at least one rotor opening and to an adjacent one of the winding heads.

7. The electric machine of claim 5, further comprising:
a first turbo-machine for recirculating the first cooling medium; and
at least one second guide apparatus at another one of the first and second axial front ends for routing the first cooling medium from an adjacent one of the winding heads to the first turbo-machine and from the first turbo-machine to the heat exchanger cover.

8. The electric machine of claim 5, further comprising:
two first turbo-machines for recirculating the first cooling medium; and
third guide apparatuses respectively arranged at the first and second axial front ends for routing the first cooling medium from the heat exchanger cover to the first turbo-machines and from the first turbo-machines to the rotor opening and a further rotor opening at a second axial front end and to the winding heads.

9. The electric machine of claim 1, wherein the first housing element has at least one passage in a region of its axial center for guidance of the first cooling medium from within the first housing element into the heat exchanger cover.

10. The electric machine of claim 1, wherein the housing has at least one first housing opening and at least one second housing opening for inflow and outflow of the second cooling medium, and further comprising a turbo-machine for recirculating the second cooling medium, said turbo-machine and the pipes of the heat exchanger cover being arranged between the first housing opening and the second housing opening.

11. The electric machine of claim 10, wherein the at least one first housing opening is arranged in a region of a first axial front end and the at least one second housing opening is arranged in a region of a second axial front end.

12. The electric machine of claim 10, wherein the at least one first housing opening is arranged in a region of a first axial front end and the at least one second housing opening is arranged in a region of an axial center.

13. The electric machine of claim 1, constructed for operation with an electrical power of at least 1 MW.

14. The electric machine of claim 1, constructed for operation with an electrical power of more than 3 MW.

15. The electric machine of claim 1, having an axial height of at least 500 mm.

16. The electric machine of claim 15, constructed in the form of a generator, a drive motor for a pump drive, a compressor drive, or a steelwork drive.

17. The electric machine of claim 15, constructed in the form of a wind power generator.

18. The electric machine of claim 1, having an axial height of at least 630 mm.

* * * * *